(12) United States Patent
Beair et al.

(10) Patent No.: US 8,770,462 B2
(45) Date of Patent: Jul. 8, 2014

(54) SOLDER PASTE TRANSFER PROCESS

(75) Inventors: William D. Beair, Carrollton, TX (US);
Michael R. Williams, Allen, TX (US);
Eric Gilley, Quinlan, TX (US)

(73) Assignee: Raytheon Company, Waltham, MA (US)

( * ) Notice: Subject to any disclaimer, the term of this patent is extended or adjusted under 35 U.S.C. 154(b) by 2 days.

(21) Appl. No.: 13/420,355

(22) Filed: Mar. 14, 2012

(65) Prior Publication Data
US 2013/0240610 A1 Sep. 19, 2013

(51) Int. Cl.
*B23K 1/20* (2006.01)
*H01L 23/48* (2006.01)
*H05K 3/34* (2006.01)

(52) U.S. Cl.
USPC ............... 228/33; 228/52; 228/207; 228/223; 228/256

(58) Field of Classification Search
CPC ..... B23K 1/203; H05K 3/3457; H05K 3/3478
USPC .......... 228/223, 224, 248.1, 254, 33, 52, 207, 228/256
See application file for complete search history.

(56) References Cited

U.S. PATENT DOCUMENTS

| | | | |
|---|---|---|---|
| 4,961,955 A * | 10/1990 | Goldberg | 427/560 |
| 5,186,982 A * | 2/1993 | Blette et al. | 427/98.4 |
| 5,197,655 A * | 3/1993 | Leerssen et al. | 228/254 |
| 5,368,883 A | 11/1994 | Beaver | |
| 5,676,305 A * | 10/1997 | Potter et al. | 228/207 |
| 5,834,062 A * | 11/1998 | Johnson et al. | 427/58 |
| 5,909,634 A * | 6/1999 | Hotchkiss et al. | 438/612 |
| 5,909,839 A * | 6/1999 | Belke et al. | 228/248.1 |
| 5,950,908 A | 9/1999 | Fujino et al. | |
| 6,029,882 A | 2/2000 | Bolde et al. | |
| 6,109,175 A | 8/2000 | Kinoshita | |
| 6,133,633 A | 10/2000 | Berger et al. | |
| 6,136,047 A | 10/2000 | Karasawa et al. | |
| 6,182,883 B1 * | 2/2001 | Nikmanesh | 228/33 |
| 6,271,110 B1 | 8/2001 | Yamaguchi et al. | |
| 6,293,456 B1 | 9/2001 | MacKay et al. | |
| 6,432,807 B1 | 8/2002 | Tsukui et al. | |
| 6,453,537 B1 | 9/2002 | Heim et al. | |
| 6,548,106 B1 | 4/2003 | Murakami | |
| 7,032,306 B1 | 4/2006 | Bourrieres | |
| 7,157,364 B2 | 1/2007 | Akram | |
| 7,317,249 B2 | 1/2008 | Crisp et al. | |
| 7,604,152 B2 | 10/2009 | Ochiai et al. | |
| 7,897,059 B2 | 3/2011 | Indyk et al. | |
| 8,022,558 B2 | 9/2011 | Law et al. | |
| 8,052,035 B2 | 11/2011 | Cheng et al. | |

\* cited by examiner

*Primary Examiner* — Devang R Patel
(74) *Attorney, Agent, or Firm* — Cantor Colburn LLP

(57) ABSTRACT

A solder paste transfer process is provided and includes defining multiple arrangements of solder pad locations on a surface, applying solder paste onto multiple transfer tools coupled to a fixture in a pre-defined configuration reflective of the multiple arrangements, disposing the fixture such that the multiple transfer tools are disposed in an inverted orientation proximate to the surface and reflowing the solder paste to flow from the multiple transfer tools to the solder pad locations.

7 Claims, 6 Drawing Sheets

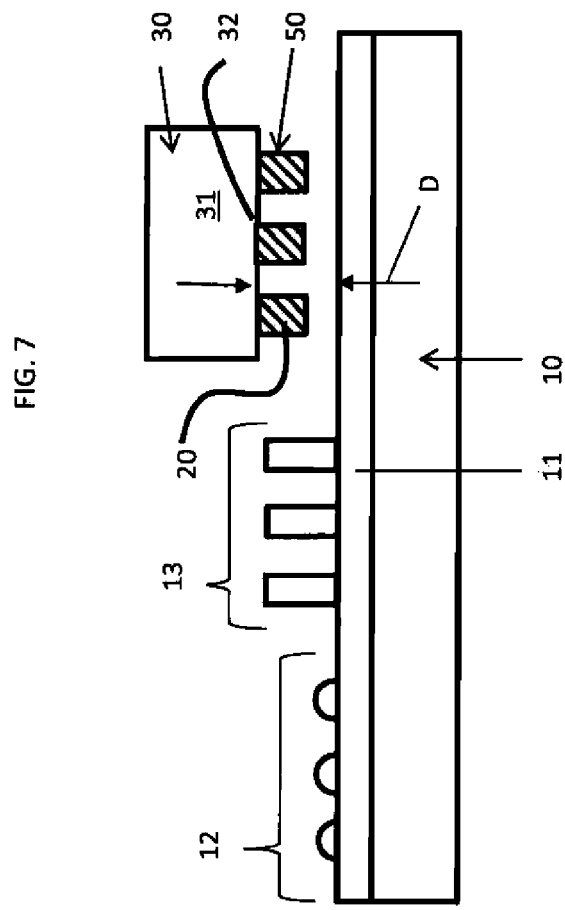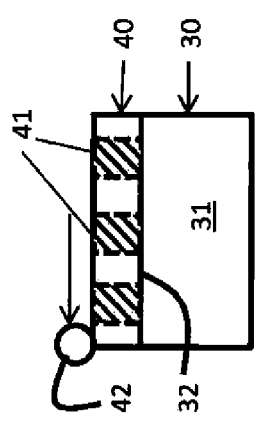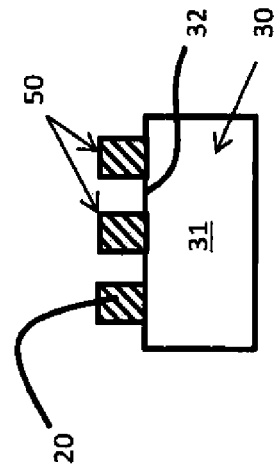

US 8,770,462 B2

SOLDER PASTE TRANSFER PROCESS

FEDERAL RESEARCH STATEMENT

The subject matter disclosed herein relates to work completed with respect to a government contract. The government has certain rights to this invention.

BACKGROUND

The subject matter disclosed herein relates to a solder paste transfer process and, more particularly, to a solder paste transfer process for non-planar surface mount assemblies.

Standard circuit cards are flat and do not have heat sinks, components or connectors attached to them. This allows solder paste to be applied using an automated screen print process. When a circuit card is not flat, however, the automated process cannot be used and the standard alternate process is to dispense solder paste onto the circuit card locations. This process is often very time consuming and has a high potential for causing solder defects.

Dispensing improvement efforts have included the introduction of the auger positive displacement valve. Auger valves use rotating threads in close proximity to a cylinder wall to force paste downward through a needle tip. These valves rely on fluid pressure to supply a continuous feed of paste into the auger chamber during dispense. Although this can be more precise than time/pressure valves, auger valves usually are more complicated to operate and have a larger degree of variables controlling dispense volume. Dispensing solder paste is also a very labor dependant process increasing assembly cost.

SUMMARY

According to one aspect of the invention, a solder paste transfer process is provided and includes defining multiple arrangements of solder pad locations on a surface, applying solder paste onto multiple transfer tools coupled to a fixture in a pre-defined configuration reflective of the multiple arrangements, disposing the fixture such that the multiple transfer tools are disposed in an inverted orientation proximate to the surface and reflowing the solder paste to flow from the multiple transfer tools to the solder pad locations.

According to another aspect of the invention, a solder paste transfer tool fixture is provided and includes a fixture body and multiple transfer tools extending from a surface of the fixture body. Each of the multiple transfer tools includes a body and a surface of the body onto which solder paste is applicable and each of the respective surfaces is non-wettable with respect to the solder paste.

According to yet another aspect of the invention, a system is provided and includes a surface on which multiple solder pad locations are defined and a solder paste transfer tool fixture. The fixture includes a fixture body and multiple transfer tools extending from the fixture body in an arrangement that is reflective of a formation of the multiple solder pad locations. Each of the multiple transfer tools includes a surface onto which solder paste is applicable, and each of the respective surfaces is non-wettable with respect to the solder paste. These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a side view of a stencil mated with the transfer tool or FIG. 2;

FIG. 6 is a side view of the transfer tool of FIG. 5 with the stencil removed and solder paste mounds left;

FIG. 7 is a side view of the transfer tool being inverted and disposed proximate to the PCB of FIG. 1;

The detailed description explains embodiments of the invention, together with advantages and features, by way of example with reference to the drawings.

DETAILED DESCRIPTION

Unique constraints inherent to the designs of circuit card assemblies, such as thermal requirements for heat sinks and precise connector locations due to mating systems, often make circuit cards non-producible with standard assembly processes. However, in accordance with aspects, inverting precision controlled amounts of solder paste at a controlled height allows for correct solder volumes to be applied to each solder joint. The calculated height allows the solder paste to make contact with the area to be soldered and allows for a proper wetting path during the melting of the solder. The calculated amounts of solder are applied to the transfer tool by the use of a laser cut stencil. This controlled amount of solder ensures that quality requirements are met.

With reference to FIGS. 1-8, a solder paste transfer process is provided. The solder paste transfer process may be employed in various applications and technologies, such as, but not limited to, the assembly of a printed circuit (or wiring) board (PCB). For purposes of clarity and brevity, the following description will apply to the exemplary assembly of the PCB although it is to be understood that the description is not intended to otherwise limit the scope of this application.

Figure 1:
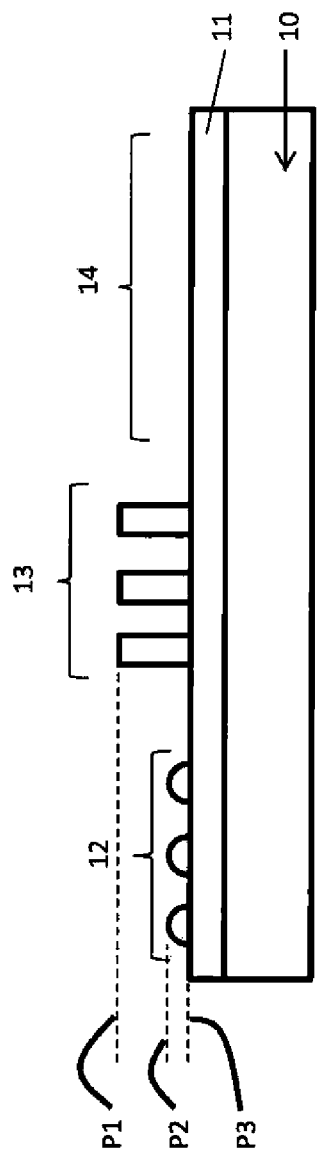
FIG. 1 is a side view of a printed circuit board (PCB) with a device layer.

With reference to FIG. 1 and, in accordance with embodiments, the solder paste transfer process is prepared. During this stage, a PCB 10 is initially assembled with a device layer 11 defined at a top-most surface thereof. The device layer 11 may have a set of solder pads 12 formed thereon by conventional processes, electrical components 13 electrically coupled to or otherwise attached to the device layer 11 and solder pad locations 14 where solder joints are required to be formed but are not and cannot be formed until other processes can be completed. The device layer 11 may be non-planar as a result of design or due to warping or other types of deformations. In other cases, the device layer 11 may be substantially planar with the solder pads 12 and/or the electrical components 13 defining multiple additional planes, P1 and P2, above a plane, P3, of the device layer 11. In either of these cases, the device layer 11 is effectively non-planar and, thus, conventional solder paste transfer processes cannot be employed easily or efficiently with respect to the solder pad locations 14 due to the fact that the conventional solder transfer tools are prevented from being positioned sufficiently proximate to the solder pad locations 14.

Figure 2:
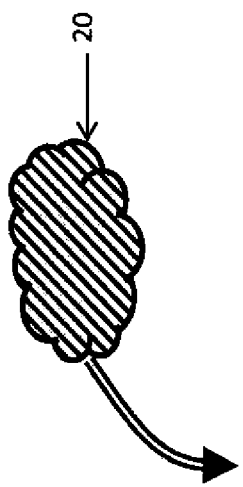
FIG. 2 is a side view of solder paste and a transfer tool.

In addition, with reference to FIG. 2, the preparation stage further includes the provision or formation of a solder paste 20 and a solder paste transfer tool 30. The solder paste 20 includes some combination of solder material and flux material and has a consistency similar to that of toothpaste. The transfer tool 30 may be provided in any form, shape or size such that it can be manipulated by an operator and/or an automatic system. In general, the transfer tool 30 has a body 31 and a surface 32. The body 31 and the surface 32 may be formed of the same or different materials. In either case, the surface 32 is formed of a material that is non-wettable under certain conditions with respect to the materials of the solder paste 20. In accordance with embodiments, the surface 32 may be formed of glass or some other similar material and/or may be machined from a body made of aluminum or some other similar material.

Figure 3:
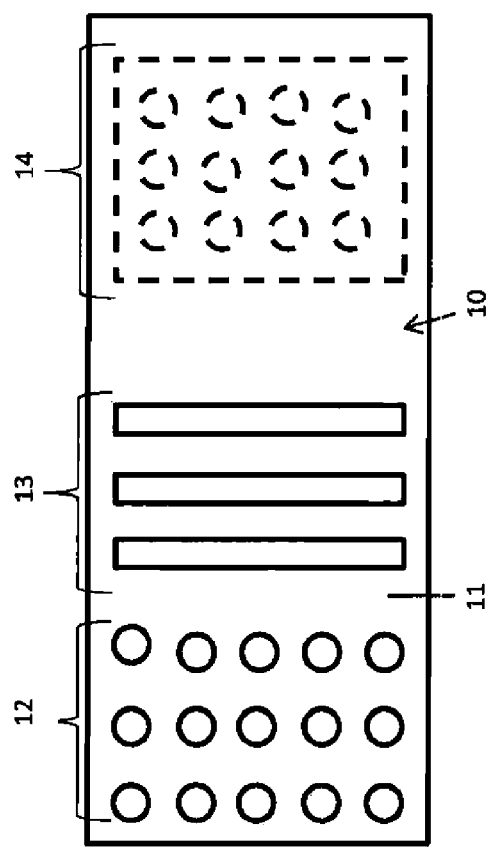
FIG. 3 is a top down view of the PCB of FIG. 1.
Figure 4:
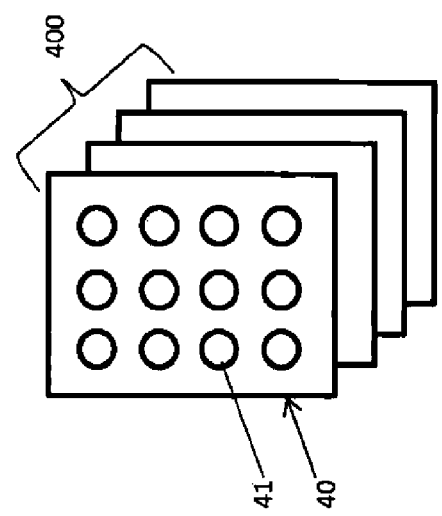
FIG. 4 is a top down view of stencils from which a particular stencil is to be chosen for use.

With reference to FIGS. 3 and 4, the device layer 11 is shown in top down perspective such that the arrangement or configuration of the solder pad locations 14 can be observed along with at least the solder pads 12 and the electrical components 13 as shown in FIG. 3. In FIG. 4, it is seen that a stencil 40 is chosen from a plurality of stencils 400. Each of the plurality of stencils 400 may have different properties, such as, but not limited to stencil thickness, aperture configuration and aperture size. As shown in FIG. 4, the particular stencil 40 is formed with a predefined configuration to define apertures 41 and is chosen to have a stencil thickness, an aperture configuration and aperture sizes that correspond to the arrangement or configuration of at least the solder pad locations 14. That is, each aperture 41 of the stencil has a position, size and shape that correspond to an associated solder pad location 14.

In addition, the thickness of the stencil 40 is chosen to determine a total amount of solder paste that will be applied to the solder pad locations 14 and is related to the types of solder joints to be formed and their proximity to one another. In particular, it is to be understood that if an excess of solder paste is applied to a solder pad location 14, it is possible that the solder paste will form bridges with solder paste of adjacent solder pad locations 14 and cause an electrical failure or short circuit. This can be avoided by employing the stencil 40 of appropriate thickness.

At the conclusion of the preparation stage, the main solder paste transfer process is begun. As shown in FIG. 5, the main solder paste transfer process initially includes an operation of mating the stencil 40 to the surface 32 of the transfer tool 30. This mating may be achieved by simply pressing the stencil 40 onto the surface 32 or temporarily adhering the stencil 40 onto the surface 32. Once the mating is complete, the solder paste 20 is screened through the stencil 40 onto the surface 32 of the transfer tool 30. The screening may be conducted by applying the solder paste 20 to the stencil 40 and passing a squeegee 42 over the stencil 40 such that a portion of the solder paste 20 is forced into the apertures 41.

With reference to FIG. 6, the stencil 40 may then be removed from the surface 32 of the transfer tool 30. In accordance with embodiments, the removal of the stencil 40 is not necessary and may be skipped in some cases. For the purposes of clarity and brevity, however, it will be hereinafter assumed that the stencil 40 is removed to thereby leave solder paste mounds 50. The solder paste mounds 50 are thus reflective of the configuration and arrangement of the apertures 41 and by extension the solder pad locations 14. The solder paste mounds 50 adhere to the surface 32 under certain conditions and, as such, the transfer tool 30 can be manipulated without risk of the solder paste mounds 50 substantially deforming.

With reference to FIG. 7, the transfer tool 30 is inverted such that the surface 32 with the solder paste mounds 50 applied thereto faces downwardly and moved to a position above the portion of the device layer 11 where the solder pad locations 14 are defined. In accordance with some embodiments, the transfer tool 30 may be secured in this position by being coupled with a fixture that is itself anchored on the PCB 10, although this is not required. The transfer tool 30 is then disposed in this inverted orientation proximate to the portion of the device layer 11 such that the solder paste mounds 50 are proximate to corresponding solder pad locations 14. The solder paste 20 of the solder paste mounds 50 is then heated and reflowed such that the solder paste 20 flows from the surface 32 of the transfer tool 30 to the solder paste locations 14 of the portion of the device layer 11.

The disposition of the transfer tool 30 in the inverted orientation proximate to the device layer 11 may include calculating a displacement, D, between the surface 32 of the transfer tool 30 and the portion of the device layer 11 whereby the reflowing of the solder paste 20 from the surface 32 to the device layer 11 can be reliably conducted. Here, it is to be understood that the reflow cannot or should not result in misplaced solder joints and/or bridging between adjacent solder joints among other types of failures. To this end, the amount of solder paste 20 in each solder paste mound 50 is controlled by selection of the stencil 40 having appropriately sized and shaped apertures 41. In addition, the displacement, D, is calculated to permit reflow from the surface 32 to the device layer 11 while preventing misplaced solder joints and bridging. Once the calculation is complete, the disposition further includes disposing the transfer tool 30 with the calculated displacement from the device layer 11.

Figure 8:
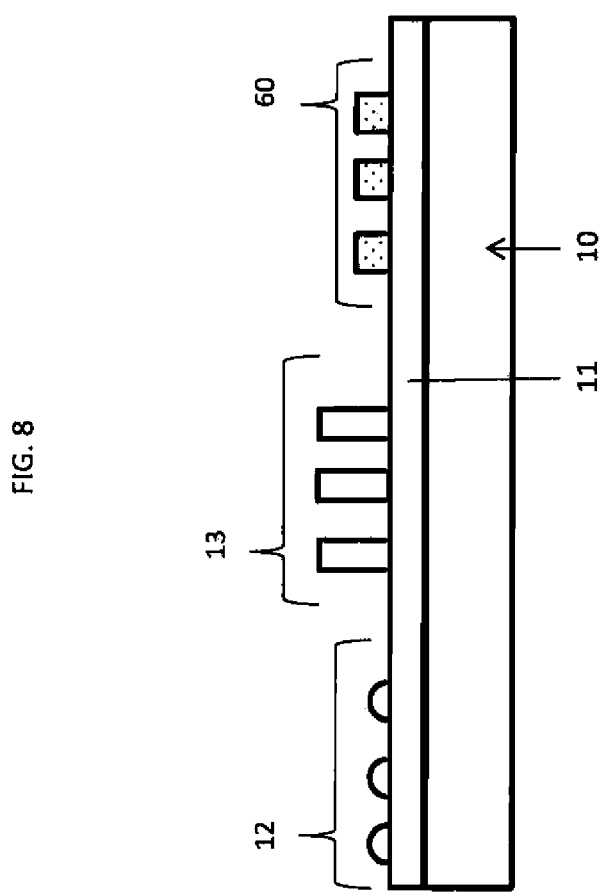
FIG. 8 is a side view of the PCB of FIG. 1 with solder pads formed thereon.

With reference to FIG. 8, once the solder paste 20 is reflowed to the device layer 11 and cooled, solder joints 60 are formed.

Figure 9:
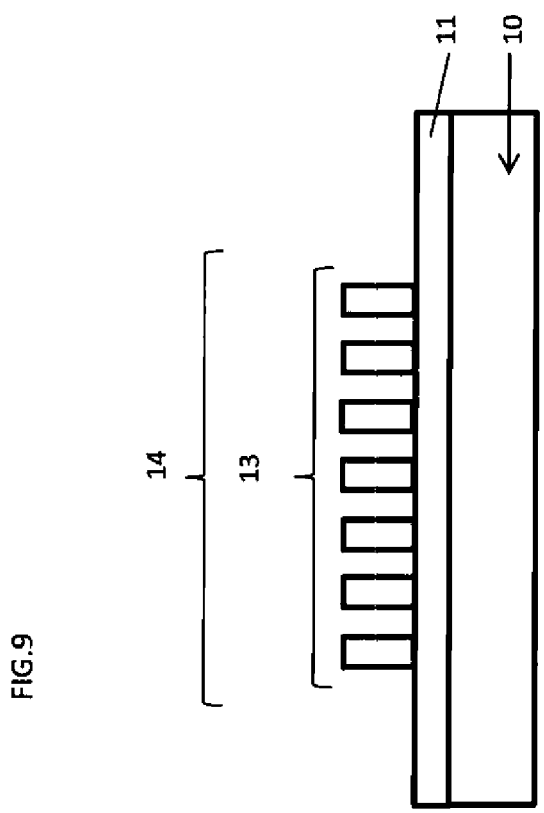
FIG. 9 is a side view of a PCB with a device layer in accordance with alternative embodiments.
Figure 10:
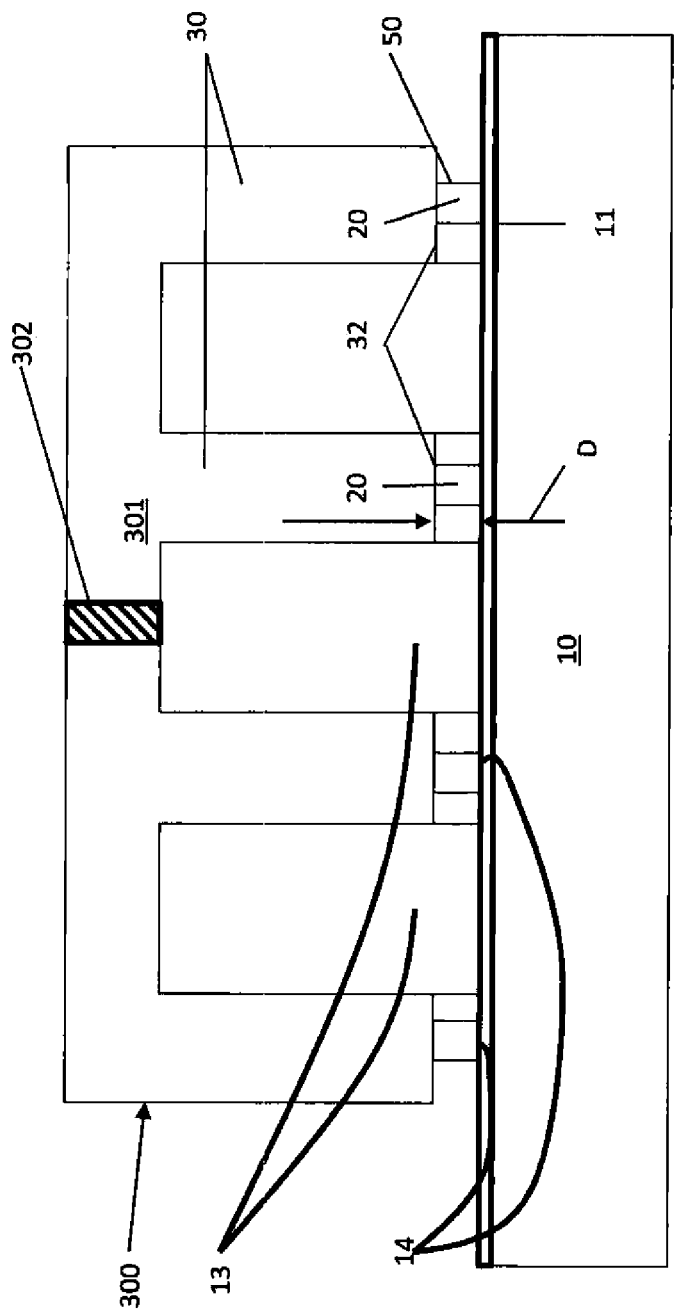
FIG. 10 is a side view of a fixture for multiple transfer tools.

With reference to FIGS. 9 and 10, it is to be understood that the electrical components 13 and the solder pad locations 14 may be arranged such that multiple sets of solder joints 60 could be formed simultaneously. In such cases, as shown in FIG. 10, the transfer tool 30 may be coupled with a fixture 300, which may be anchored on the PCB 10. Although this type of arrangement is illustrated in FIG. 9 with multiple rows of interleaved electrical components 13 and solder pad locations 14 and in FIG. 10 with the fixture 300 having multiple transfer tools 30 that are aligned to fit between the electrical components 13, it is to be understood that this configuration is merely exemplary and that other configurations are possible.

For the embodiments of FIGS. 9 and 10, in which multiple rows of electrical components 13 are interleaved with solder pad locations 14, the fixture 300 may include a rigid fixture body 301 having a surface from which multiple transfer tools 30 extend on either side of each of the electrical components 13. Solder paste 20 may be applied to the respective surfaces 32 of the multiple transfer tools 30 in a manner as described above although it is to be understood that the stencil 40 may be provided as one or more stencils 40 that are each uniquely chosen for each individual surface 32 or as a single stencil 40 that is usable for each surface 32 simultaneously. Once the solder paste 20 is applied to the surfaces 32, the fixture body 301 may be fastened or affixed to an upper surface of at least one or more of the electrical components 13 by a fastener 302 such that the fixture 300 is constrained in a predefined position.

The predefined position is defined as one in which the multiple transfer tools 30 extend from the surface of the fixture body 301 in inverted orientations with the multiple transfer tools 30 being aligned with the multiple rows of solder pad locations 14. The predefined position is further defined such that a displacement, D, between the surfaces 32 of the multiple transfer tools 30 and the device layer 11 is set whereby the reflowing of the solder paste 20 from the surfaces 32 to the device layer 11 can be reliably conducted. The displacement, D, may be calculated substantially as described above and need not be uniform for each of the multiple transfer tools 30. For example, some transfer tools 30 may be longer than others such that their respective surfaces 32 are closer to the device layer 11 than those of the other transfer tools 30 when the fixture body 301 is fastened to the one or more electrical components 13. In these or other cases, an amount of solder paste applied to such surfaces 32 may also be varied as necessary.

Thus, the fixture 300 allows multiple transfer tools 30 to be deployed simultaneously while maintaining optimal material mass for satisfaction of thermal characteristics of the reflow oven process profile.

Although the embodiments illustrated in FIGS. 9 and 10 include multiple electrical components 13 that each have substantially similar shapes and sizes and multiple transfer tools 30 that also have similar shapes and sizes, it is to be understood that this is not necessary and that other non-uniform configurations are possible. For example, at least one or more of the multiple electrical components 13 may have a unique shape and size and, in such a case, at least the adjacent ones of the multiple transfer tools 30 may have complentarily unique shapes and sizes as well.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system, comprising:
a device layer surface on which multiple electrical components are disposed and multiple solder pad locations are defined remotely from the multiple electrical components; and
a solder paste transfer tool fixture including a fixture body and multiple transfer tools extending from the fixture body in an arrangement that is reflective of a formation of the multiple solder pad locations,
each of the multiple transfer tools comprising a surface onto which solder paste is applicable the surfaces being non-wettable with respect to the solder paste during an elevated temperature condition at which the solder paste is reflowable from the surfaces, and
the fixture body being disposable proximate to the device layer surface with the multiple transfer tools interleaved between the multiple electrical components and each of the respective surfaces of each of the multiple transfer tools facing corresponding ones of the multiple solder pad locations.

2. The system according to claim 1, wherein the device layer surface is non-planar.

3. The system according to claim 1, wherein the fixture body is affixed to at least one of the multiple electrical components.

4. The system according to claim 1, wherein the multiple electrical components have the same shape.

5. The system according to claim 4, wherein the multiple transfer tools have the same shape.

6. The system according to claim 1, wherein at least one or more of the multiple electrical components has a different shape from at least another one or more of the multiple electrical components.

7. The system according to claim 6, wherein at least one or more of the multiple transfer tools has a shape that complements the unique shape of the at least one or more of the multiple electrical components.

* * * * *